Sept. 7, 1926.  
J. MULLER  
1,599,099  
DEVICE FOR OBTAINING A TIGHT AND RAPID CONNECTION WITH LUBRICATORS  
Filed May 15, 1923
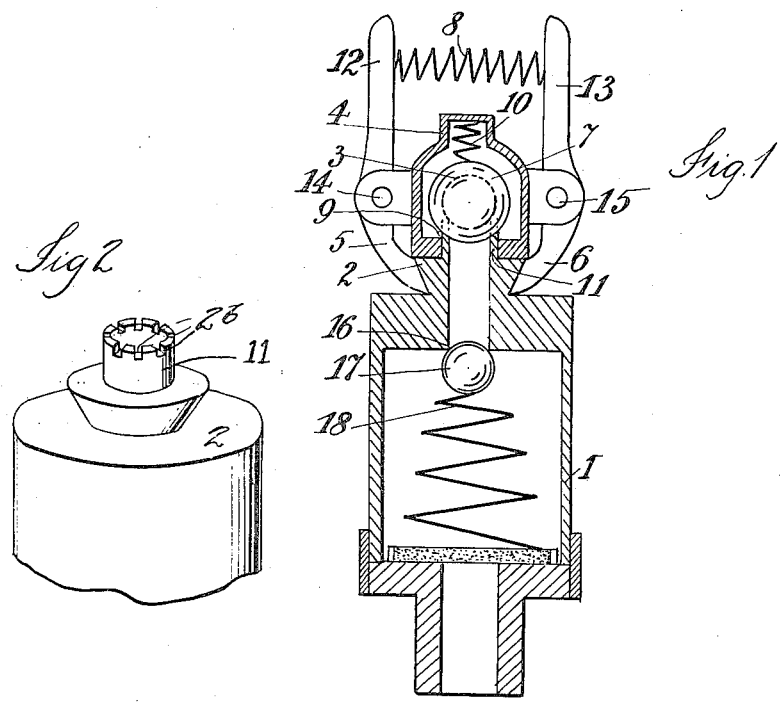

Patented Sept. 7, 1926.

1,599,099

UNITED STATES PATENT OFFICE.

JACQUES MULLER, OF LA GARONNE COLOMBES, FRANCE.

DEVICE FOR OBTAINING A TIGHT AND RAPID CONNECTION WITH LUBRICATORS.

Application filed May 15, 1923, Serial No. 639,150, and in France November 30, 1922.

My invention relates to a device enabling a rapid connection of the part to be lubricated and the oil tube coming from the injector, ensuring at the same time a perfect tightness so long as both parts are so connected together and when said device is withdrawn from the part to be lubricated.

For the sake of example, the appended drawing shows a means of executing this invention.

Figure 1 is a vertical section of my device and a lubricator connected therewith.

Figure 2 is a fragmentary perspective view of the upper end of the lubricator.

A lubricator 1, of any known design, is provided at the upper part with a hollow and externally truncated part 2. Another part 4 carrying two movable dogs 5 and 6, so designed as to correspond to the shape of truncated part 2 is fitted to the pipe 3 coming from the lubricating oil injector. 8 is a spring between the handle portions 12 and 13 of the dogs 5 and 6. Part 4 being hollow contains a ball 7 which is normally pushed downward by means of spring 10 against the opening 9 of said part 4.

At its upper end the extension 11 of the inverted truncated conical portion of the part 2 is formed with grooves 2$^b$ on its upper end upon which the ball 7 seats. The lubricating oil finds its way through these grooves.

When the spring 8 is compressed the part 4 can be placed upon the part 11 of the part 2 which latter will raise the ball 7. When the ball 7 is seated on the extension the oil can pass through the grooves or passages of the part 4.

When part 4 is removed from the lubricator, the ball 7 is maintained on its seat 9 by means of spring 10 and the higher the pressure is within the injector, the higher the tension is on the seat; a perfect tightness is thus secured.

Upon exerting a pressure on levers 12 and 13 of dogs 5 and 6 these latter pivot about their respective axes 14 and 15, spring 8 is compressed and it is then possible to fit the truncated portion of part 2 within the union dogs. When levers 12 and 13 are freed, the spring 8 brings dogs 5 and 6 into contact with the truncated portion of part 2 and provides a perfectly tight union whilst extension piece 11 of part 2 causes the ball 7 to rise in order to enable the lubricating oil to flow into the lubricator 1, passing by the grooves of part 11. Lubricator 1 is connected to the part to be oiled in any convenient manner. When the ball 7 is raised from its seat the lubricant from the chamber of the part 4 flows through the vertical passage in the neck of the member 1 into the latter.

If the lubricator is horizontal, its upper duct 16 is closed by means of a ball 17 equipped with a spring 18 preventing the lubricant from returning into the lubricator.

While I have shown but one construction of this invention, I do not purpose limiting this application for patent thereto, as many details of construction and operation may be varied without departing from the principle of my invention, as for instance the internal part of the lubricator which can be filled with felt or any other similar substance, the thickness of which would regulate the delivery of the lubricant in each particular case.

Having particularly described and ascertained the nature of my said invention and the manner in which it is to be performed, I declare that what I claim is:—

A connection for a lubricant receptacle and a lubricant supplying means comprising a truncated conical portion on the end of the receptacle, said truncated portion tapering toward said receptacle and being surrounded by a tubular extension, said extension and truncated portion being bored for the passage of lubricant into said receptacle, a hollow truncated member for the lubricant supplying means having an opening adapted to snugly receive said tubular extension and a flat bottom to rest on the top of said truncated portion, jaw members pivoted to said terminal member and having inclined jaws cooperable with the conical surface of the truncated portion to draw the terminal into fluid tight engagement with said receptacle, a spring for holding said jaw members in engagement with said truncated portion, and a spring pressed valve in said hollow terminal member seating in said opening, and displaceable from its seat by said tubular extension on said receptacle.

In testimony whereof I hereunto affix my signature.

JACQUES MULLER.